(No Model.)
I. WOOD.
SULKY.
No. 488,236. Patented Dec. 20, 1892.
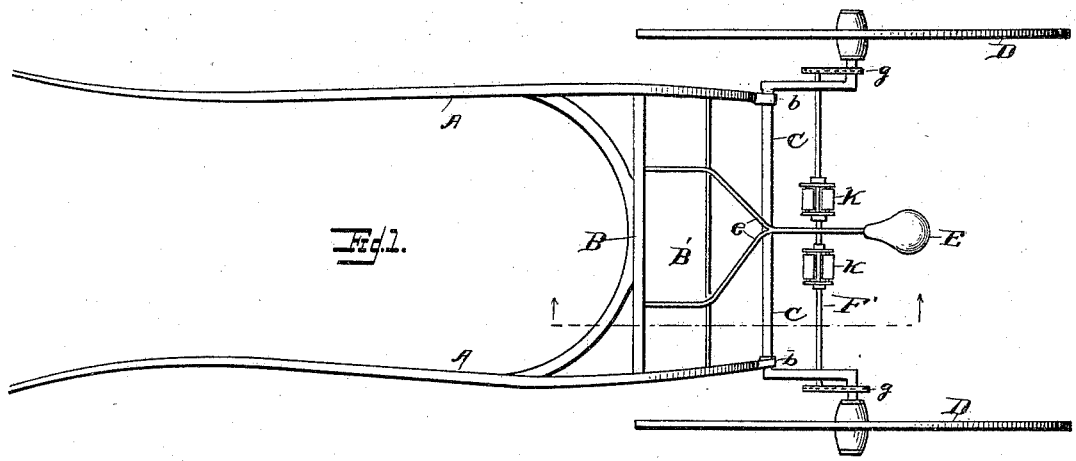
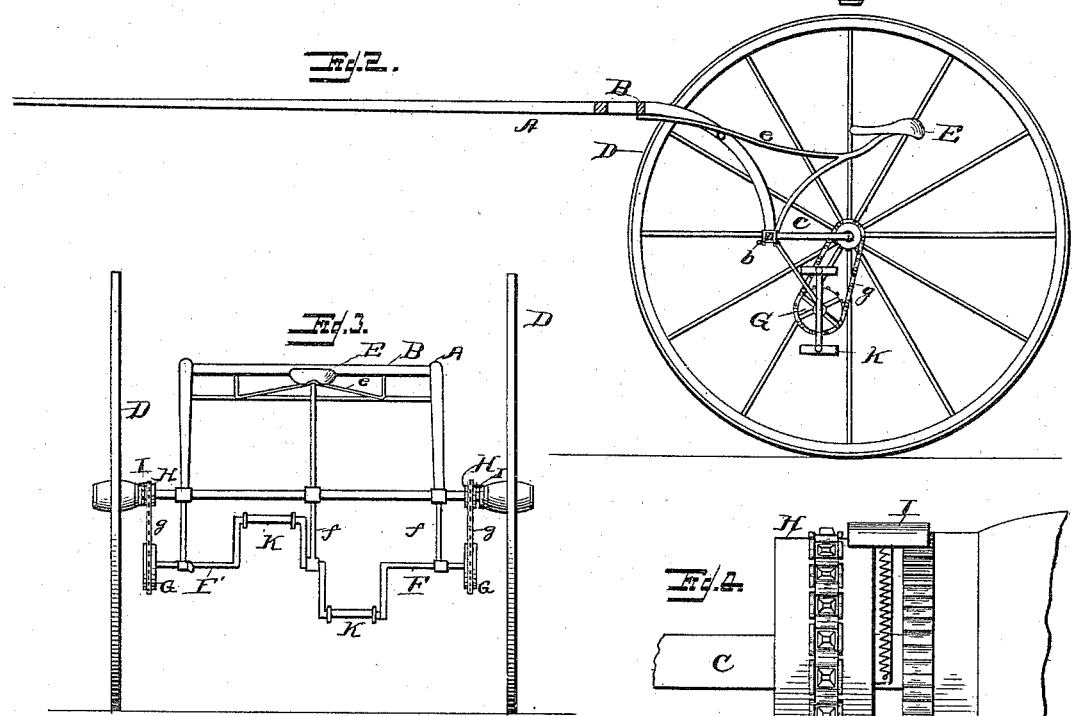
WITNESSES
J. M. Fowler Jr.
Aly Stewart
INVENTOR
Isaac Wood
by Lowe Freer & Co
his Attorneys

UNITED STATES PATENT OFFICE.

ISAAC WOOD, OF MINNEAPOLIS, MINNESOTA.

SULKY.

SPECIFICATION forming part of Letters Patent No. 488,236, dated December 20, 1892.

Application filed January 28, 1892. Serial No. 419,587. (No model.)

*To all whom it may concern:*

Be it known that I, ISAAC WOOD, of Minneapolis, in the county of Hennepin and State of Minnesota, have invented a certain new and useful Improved Sulky; and I do hereby declare the following to be a full, clear, and exact description of the same, reference being had to the accompanying drawings, forming a part of this specification, and to the letters of reference marked thereon.

This invention relates to improvements in that class of light wheeled vehicles adapted to be drawn by horse power commonly known as sulkies. Vehicles of this class are usually employed for training or speeding horses, and it is the object of the present invention to provide such a vehicle in which the draft may be removed from the horse when desired. Thus in trying the speed of young horses or colts to determine their probable speed in the future they may be made to feel as if moving perfectly free of any incumbrance, and if desired, the draft of the vehicle may be gradually and almost imperceptibly thrown on them, a result highly useful in training, as will be at once perceived by trainers and horsemen in general. So too, when a horse is inclined to balk the tendency may be overcome by removing the draft and if necessary causing the vehicle to move him forward positively. To accomplish these results the vehicle is provided with a means whereby the driver may propel it through a treadle power. Thus the invention may be said to consist broadly in providing a sulky with a foot treadle propelling mechanism, and, further, in certain novel details of construction and combinations and arrangements of parts, all, as will now be described and pointed out particularly in the appended claims.

In the accompanying drawings: Figure 1 is a top plan view of a sulky constructed in accordance with my present invention. Fig. 2 is a sectional view taken just inside the near wheel and shaft. Fig. 3 is a rear elevation. Figs. 4 and 5 are details of the ratchet mechanism.

Similar letters of reference in the several figures indicate the same parts.

The sulky may, as usual, consist of a pair of light but strong shafts A with the usual cross piece B and clips $b$ for attachment to the axle C. This axle, in the structure shown, is for convenience and economy of space, cranked substantially horizontally, and, the wheels D are mounted on the rearwardly extending crank ends.

The seat E, for the driver, is mounted on the rear ends of the rods $e$ secured beneath the cross piece B at the forward ends, and resting on the cross bar B' at an intermediate point forming a strong and rigid, yet exceedingly light structure. Below the seat, and, at a convenient position for operation by the driver, is the treadle gear propelling mechanism connected by suitable power transmitting mechanism or gearing with the wheels. For the treadle gear propelling mechanism I preferably employ an ordinary bicycle gearing, consisting of the crank or pedal shaft F' journaled in bearings carried by hangers $f$ depending from the axle or other part of the frame and carrying at the ends sprocket wheels G, which, through drive chains $g$, communicate motion to sprocket wheels H, journaled loosely on the axle in proximity to the ground wheels. The sprocket wheels are preferably connected with the hubs of the ground wheels through a clutch gearing, whereby the ground wheels may be allowed to rotate faster than the pedals to relieve the driver when the speed of the horse becomes too great, or to permit the draft of the vehicle to be gradually shifted to the horse as will be readily understood. Any desired form of clutch may be interposed between the pedal shaft and wheels, but that shown is preferred for its simplicity, consisting simply of pawls I carried by the sprocket wheels H, adapted to co-operate with the toothed rear edges $i$ of the inner hub bands, and if desired one side of the pawls may rest on flanges of the sprocket wheels to limit inward movement as shown. The pedal shaft is cranked at each side of the center, and pedals K of the ordinary bicycle or any desired pattern are secured thereon in convenient position for the driver's feet.

In operation, the horse or colt is harnessed up between the shafts in the ordinary manner. Then the driver seating himself on the saddle and applying his feet to the treadle movement may propel the vehicle and the horse be thereby relieved of practically all draft. The seat is preferably located just over or very slightly back of the center of gravity thus relieving the horse of the weight on the shafts as well as the draft.

By the use of this sulky, it is thought the probable future speed of young horses may be much more satisfactorily ascertained than heretofore and the training of horses for track and domestic purposes much more easily accomplished.

Having thus described my invention what I claim as new is:

1. The combination with a sulky adapted to be drawn by a horse and its ground wheels, of a treadle gear propelling mechanism and a clutch interposed between said propelling mechanism and ground wheels; substantially as described.

2. The combination with a sulky adapted to be drawn by a horse and its ground wheels, of a treadle gear propelling mechanism, sprocket wheels driven thereby and a pawl and ratchet connection between said sprocket wheels and ground wheels; substantially as described.

3. In a sulky, the combination with the shafts, axle and ground wheels, of the cranked pedal shaft hung below the level of the axle, the gearing between the pedal shaft and axle having a clutch interposed therein and the seat suspended in rear of the axle; substantially as described.

4. In a sulky, the combination with the shafts, axle having the forwardly cranked central portion and ground wheels, of the cranked pedal shaft hung below the level of the axle, the gearing between the pedal shaft and axle having a clutch interposed therein, and the seat suspended in rear of the central forwardly cranked portion of the axle; substantially as described.

In testimony whereof I have hereunto set my hand in presence of two subscribing witnesses.

ISAAC WOOD.

Witnesses:
  LOUIS FEESER, Jr.,
  HENRY ROCHAT.